United States Patent [19]

Bayat

[11] 4,442,984

[45] Apr. 17, 1984

[54] ELECTRIC CORD REEL

[76] Inventor: Bijan Bayat, 1717 Jasmine Cir., Plano, Tex. 75074

[21] Appl. No.: 359,805

[22] Filed: Mar. 19, 1982

[51] Int. Cl.³ .............................................. B65H 17/52
[52] U.S. Cl. .................................... 242/106; 191/12.4; 242/96
[58] Field of Search ......................... 242/96, 106, 107; 191/12.2 R, 12.2 A, 12.4; 24/18, 115 R, 121, 255 R, 255 BS; 248/200, 205 R, 534

[56] References Cited

U.S. PATENT DOCUMENTS

| 1,018,599 | 2/1912 | Woods . | |
|---|---|---|---|
| 1,216,319 | 2/1917 | Huling . | |
| 2,525,992 | 10/1950 | Wynn | 242/96 |
| 2,530,114 | 11/1950 | Bugg et al. | 242/107 |
| 2,856,470 | 10/1958 | Hyde | 191/12.4 |
| 2,947,493 | 8/1960 | Schneider et al. | 242/96 |
| 2,976,374 | 3/1961 | Poulsen | 191/12.4 |
| 2,991,523 | 7/1961 | Del Conte | 24/71.2 |
| 3,815,078 | 6/1974 | Fedrick | 339/28 R |
| 3,929,210 | 12/1975 | Cutler et al. | 191/12.2 R |
| 4,141,438 | 2/1979 | Diem | 191/12.4 |
| 4,284,180 | 8/1981 | Masters | 191/12.2 R |

FOREIGN PATENT DOCUMENTS 1332216 10/1973 United Kingdom ................ 242/106

Primary Examiner—Leonard D. Christian
Attorney, Agent, or Firm—Hubbard, Thurman, Turner & Tucker

[57] ABSTRACT

An electric cord reel is provided for temporary storage of an electric extension cord. A plastic rectangular frame which includes means for mounting said frame to a wall or other vertical architectural barrier is utilized to pivotally mount a spool. The spool includes a central hub and opposing end plates. The opposing end plates are tapered inward toward the center of the hub to enhance cord winding during operation. A pair of flexible protuberances are mounted to said central hub section and are utilized to receive and releasably retain either end of an electric extension cord. A hand crank is fixedly mounted to the spool and is utilized to rotate the spool upon operation thereof.

3 Claims, 2 Drawing Figures

ELECTRIC CORD REEL

BACKGROUND OF THE INVENTION

This invention relates to electric extension cord storage reels in general and in particular to electric extension cord storage reels which include means for receiving and releasably retaining one end of an electric extension cord.

Electrical extension cords are highly ubiquitous items which are widely utilized in industrial and commercial establishments as well as in residences. The storage of such cords represents a possible safety hazard due to possible tripping or damage to the electric extension cord which may result in future electric shock hazards. Additionally, the unorganized storage of electric extension cords is highly unsightly.

Numerous automatic retraction reels are known in the prior art and are utilized commonly in electrical appliances in which one end of the extension cord is fixedly connected to a particular appliance, such as a vacuum cleaner. Further, several electric cord reels are known which utilize slip rings or movable connectors to maintain electrical connection to the wire wrapped around the reel during rotation of the reel. Simple reels for storage of electric extension cords are also known; however, each of these known reels is deficient in its lack of any means for receiving and releasably retaining one end of the electric extension cord during retraction of the cord in order to assist the operator in winding the cord around the hub of the reel.

SUMMARY OF THE INVENTION

It is therefore one object of the present invention to provide an improved electric extension cord storage reel.

It is another object of the present invention to provide an improved electric extension cord storage reel which includes means for receiving and releasably retaining at least one end of an electric extension cord during retraction of the cord.

It is yet another object of the present invention to provide an improved electric extension cord reel which may be inexpensively manufactured.

The foregoing objects are achieved as is now described. A rectangular plastic frame which includes means for mounting said frame to a wall or other vertical architectural barrier is provided and utilized to pivotally mount a spool. The spool includes a central hub and opposing end plates. The opposing end plates are tapered inward toward the center of the hub to enhance cord winding during operation. A pair of flexible protuberances are mounted to said central hub section and are utilized to receive and releasably retain either end of an electric extension cord. A hand crank is fixedly mounted to the spool and is utilized to rotate the spool upon operation thereof.

BRIEF DESCRIPTION OF THE DRAWINGS

The novel features believed characteristic of the invention are set forth in the appended claims. The invention itself; however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
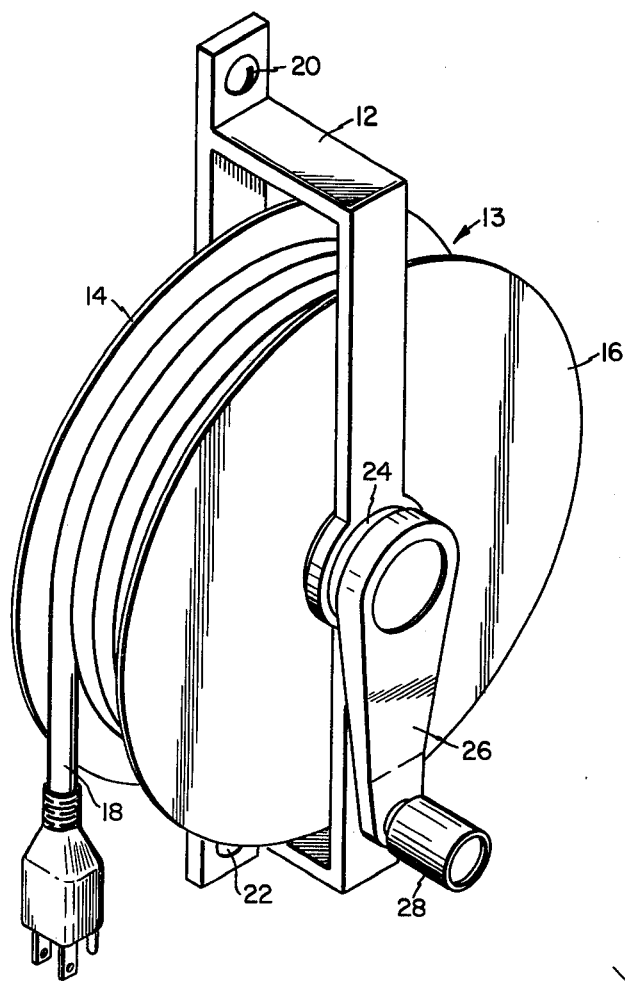
FIG. 1 depicts a perspective view of the novel electric extension cord storage reel of the present invention.

With reference now to the figures and in particular with reference to FIG. 1, there is depicted a perspective view of the novel electric extension cord storage reel of the present invention. The storage reel is comprised of a rectangular frame structure 12 which serves as a pivotal mounting point for spool 13. Spool 13 includes two opposing end plates 14 and 16 which serve to retain the electric extension cord 18 within the spool.

In a preferred embodiment of the present invention, both frame 12 and spool 13 are constructed of a high impact plastic material such as polystyrene and may be injection molded or manufactured by any process well known in the art. Also, in a preferred embodiment of the present invention, frame 12 includes means for attaching frame 12 to a wall or other vertical architectural barrier. In the depicted embodiment of the present invention, mounting screws 20 and 22 serve this purpose.

Rigidly mounted to spool 13, through aperture 24, is crank arm Crank arm 26 includes handle 28 which may be rigidly or pivotally mounted to crank arm 26. As those skilled in the art will appreciate, upon actuation of crank arm 26, spool 13 will rotate, causing electric extension cord 18 to be wrapped around spool 13.

Figure 2:
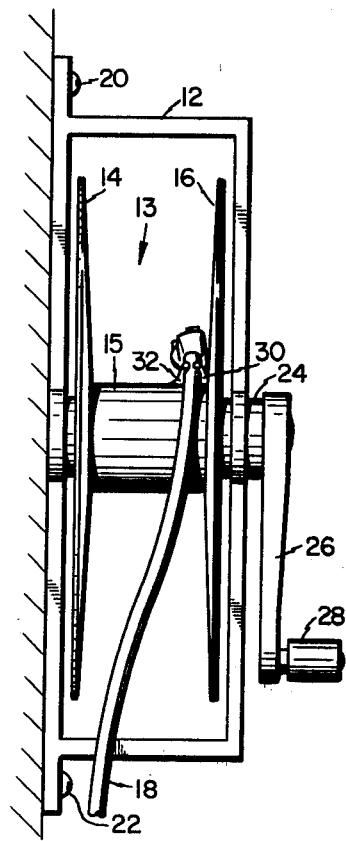
FIG. 2 depicts an end view of the novel electric extension cord storage reel of the present invention.

Referring now to FIG. 2, there is depicted an end view of the novel electric extension cord storage reel of the present invention. As can be seen in FIG. 2, spool 13 is comprised of end plates 14 and 16 and a central hub 15. End plates 14 and 16 are tapered inward toward the center of central hub 15. This taper is effective to enhance the winding of extension cord 18 around central hub 15 during rotation of spool 13.

An important feature of the novel electric extension cord storage reel of the present invention is clearly depicted in FIG. 2. Retaining clips 30 and 32 are mounted to central hub 15 and serve to receive and releasably retain either the male or female end of electric extension cord 18. In a preferred embodiment of the present invention, clips 30 and 32 are mounted radially outward from central hub 15 and are constructed of a flexible plastic material which is preferably molded at the same time as central hub 15, forming an integral portion thereof. Clips 30 and 32 serve an important purpose in the operation of the storage reel of the present invention by serving to retain either end of electric extension cord 18 to allow initial winding of extension cord 18 around central hub 15 of spool 13 during storage operation.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. An electric cord reel for temporary storage of an electric extension cord, said cord reel comprising:

a rectangular frame structure;

a spool pivotally mounted to said rectangular frame structure including a central hub section and opposing end plates disposed at opposite ends of said central hub;

a crank fixedly mounted to said central hub for rotating said spool upon operation thereof; and a pair of flexible protuberances readily disposed outward from said central hub for receiving and releasably retaining at least one end of an electric extension cord.

2. The electric cord reel according to claim 1 wherein said means for receiving and releasably retaining said at least one end of said electric extension cord and said central hub section are injection molded from a single piece of a plastic material.

3. The electric extension cord reel according to claim 2 wherein said means for receiving and releasably retaining said at least one end of said electric extension cord and said central hub section are injection molded utilizing polystyrene plastic.

* * * * *

UNITED STATES PATENT AND TRADEMARK OFFICE
CERTIFICATE OF CORRECTION

PATENT NO. : 4,442,984
DATED : April 17, 1984
INVENTOR(S) : Bijan Bayat

It is certified that error appears in the above-identified patent and that said Letters Patent is hereby corrected as shown below:

Column 2, line 27 (page 4, lines 16-17), "arm Crank" should be --arm 26. Crank--.

Signed and Sealed this

Fourth Day of September 1984

[SEAL]

Attest:

GERALD J. MOSSINGHOFF

Attesting Officer

Commissioner of Patents and Trademarks